Patented Feb. 6, 1951

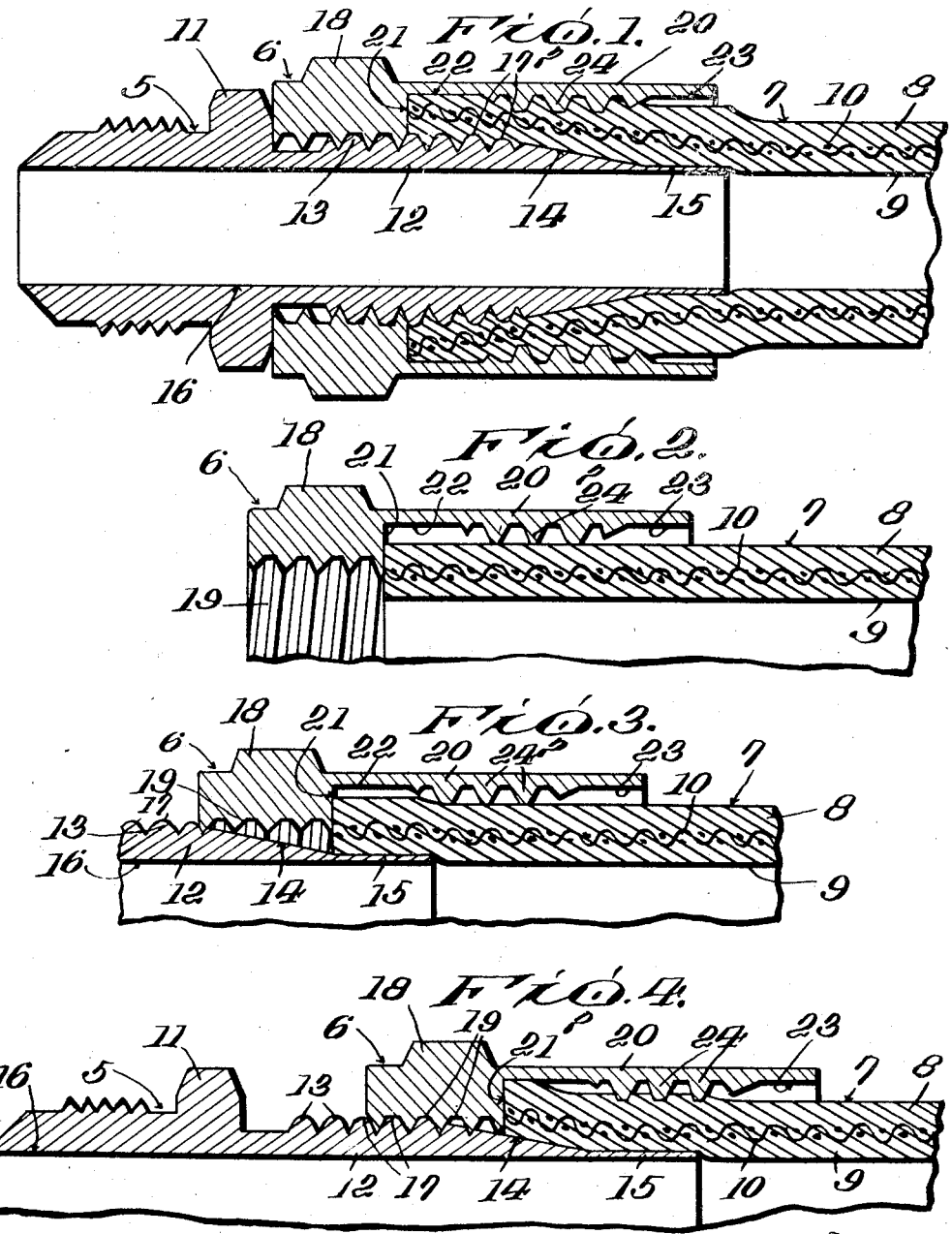

2,540,113

UNITED STATES PATENT OFFICE 2,540,113

TWO-PIECE HOSE COUPLING

Emmett C. Hartley and John N. Wolfram, Cleveland, Ohio, assignors to The Parker Appliance Company, Cleveland, Ohio, a corporation of Ohio Application February 18, 1944, Serial No. 522,895

3 Claims. (Cl. 285—86)

The invention relates generally to hose couplings and primarily seeks to provide a novel form of hose coupling particularly adapted for secure attachment on a flexible, high pressure hose line and comprising two threadably connected pieces having provision for securely gripping the end of such a hose line between them as they are threadably assembled.

In its more detailed nature the invention resides in providing a two piece hose coupling comprising a nipple member and a clamp sleeve threadable onto the nipple, the nipple and sleeve being so constructed as to effect a clamping of the hose in an annular chamber in the sleeve and against a tapered extension of the nipple as the parts are threadably assembled. The nipple includes external threads which are embedded in the hose end at the inner end of the sleeve chamber, and the sleeve has internal ribs which are embedded in the exterior of the hose in a portion axially spaced from the portion in which the nipple threads are embedded therein.

Another object of the invention is to provide a coupling of the character stated in which the threads on the nipple extension which projects into the sleeve chamber to be embedded in the hose and clamped therein are rounded externally to avoid objectionable weakening of the clamped internal hose surface.

Another object of the invention is to provide a coupling of the character stated in which the nipple tapered end extension includes a thin cylindriform end extremity, and in which the inwardly extending ribs on the clamp sleeve member have an internal diameter substantially the same as the normal external diameter of the hose to be clamped whereby initial insertion of the cylindriform extremity into the hose end will expand the hose end into the inner end of the sleeve chamber and against the inwardly directed sleeve rib nearest the hose end during the initial stage of the coupling of the hose end, thereby to facilitate completion of the nipple insertion and final clamping of the hose end by threading together of the nipple and sleeve.

Still another object of the invention is to provide a coupling of the character stated in which the clamp sleeve terminates at its end remote from the clamped hose end in a smooth internal surface dimensioned to surround the external surface of the clamped hose in spaced relation thereby to prevent abrading contact of the sleeve end extremity with the hose when the hose is flexed.

With the above and other objects in view that will hereinafter appear, the nature of the invention will be more clearly understood by reference to the following detailed description, the appended claims, and the several views illustrated in the accompanying drawings.

In the drawings:

Figure 1 is a longitudinal sectional view illustrating a hose coupling embodying the invention, the fully clamped condition of the coupling being illustrated.

Figure 2 is a fragmentary sectional view illustrating the hose end to be clamped initially inserted in the clamp sleeve of the coupling.

Figure 3 is a view similar to Figure 2 illustrating the initial stage of the coupling assembly, namely the insertion of the cylindriform end extremity of the nipple into the end of the hose.

Figure 4 is a view similar to Figure 3 and illustrates a progressive stage of the coupling assembly prior to the complete threading home of the sleeve onto the nipple.

The coupling herein disclosed as an example of embodiment of the invention, includes a nipple member generally designated 5 and a socket or clamp sleeve member generally designated 6, said nipple and sleeve members being constructed in a manner for cooperating, when threadably connected in securely, clamping between them an end of a flexible, high pressure hydraulic hose generally designated 7. Such hose usually includes an outer layer 8 of rubber, an inner layer 9 of rubber and an interposed reinforcing braid, usually formed of wire. Obviously any other form of flexible hose can be clamped in the manner hereinafter described.

The nipple member includes a non-circular or nut portion 11 providing an abutment shoulder, and a male extension 12 having an externally threaded portion 13 merging into a tapered portion 14 which in turn merges into a thin cylindriform end extremity 15. It will be observed by reference to Figure 1 of the drawings that the nipple member is equipped with a flow bore 16 which is substantially of the same diameter as the internal diameter of the clamped hose. It will also be apparent by reference to Figures 1 and 4 that the threads on the nipple member are rounded externally as at 17.

The socket or clamp sleeve 6 includes a non-circular or nut portion 18 which is internally threaded as at 19 to thread onto the external threaded portion 13 of the nipple member, and the sleeve includes a cylindrical extension 20 which is counter-bored to provide a hose end receiving chamber terminating at its inner end in a hose end abutment wall 21. At its inner end the chamber includes a smooth cylindrical wall 22 adjacent the abutment wall 21, and at its outer end the chamber terminates in a smooth cylindrical wall portion 23. Between the smooth wall portions 22 and 23 the inner wall defining the chamber is equipped with a series of inwardly directed ribs or threads 24, and it will be apparent by reference to Figure 2 that the inner diameter of said ribs or threads is substantially the same as the external diameter of the hose which is to be clamped so that the hose end can be readily inserted into the receiving chamber in the manner clearly illustrated in Figure 2.

In assembling the coupling the hose is first inserted into the clamp sleeve chamber with the end thereof in engagement with the abutment wall 21 in the manner illustrated in Figure 2. The smooth cylindriform end extremity 15 of the nipple member is then inserted in the hose end in the manner clearly illustrated in Figure 3. Because of the provision of the smooth cylindriform end extremity 15 the nipple can be readily inserted into the hose end without exerting much of an axial component tending to shift the hose away from the abutment wall 21. This initial insertion readily expands the hose into the annular chamber portion defined by the smooth wall 22 and into engagement with the inwardly directed rib or thread 24 nearest said abutment wall. Now greater expansive forces can be applied because the innermost thread or rib 24 will immediately be embedded in the hose and thereby prevent axial displacement of the hose during progressive assembly of the coupling elements.

As the clamp sleeve member 6 is threaded onto the nipple member 5 as in Figure 4, the tapered nipple portion 14 expands the hose into the annular chamber in the sleeve member, causing the well rounded threads 13 to become embedded in the internal wall of the hose end, and the inwardly directed sleeve ribs or threads 24 to be embedded in the external surface of said hose end in the manner clearly illustrated in Figure 1. The cylindriform end portion 15 of the nipple member prevents billowing of the hose over the end extremity of the nipple and provides a smooth flow passage continuity in the hose and in the coupling.

It will be apparent by reference to Figure 1 of the drawing that in the completely assembled coupling, the rounded externally directed threads 13 of the nipple member are opposite the smooth internal wall 22 of the clamp sleeve, and the internally directed ribs or threads 24 of the sleeve member are opposite the tapered portion 14 of the nipple member. Also, the cylindriform end extremity 15 of the nipple member is disposed opposite the smooth cylindrical inner wall 23 of the clamp sleeve member, and since the space intervening said nipple end extremity 15 and the cylindrical wall 23 is greater than the wall thickness of the clamped hose end, a clearance is provided about the hose end within said cylindriform wall portion 24. The provision of this clearance prevents abrading contact of the sleeve end extremity with the hose when the hose is flexed.

In the fully clamped coupling, the zone of maximum clamping pressure is opposite the innermost rib or thread 24, and at the position of the tapered portion 14 of the nipple member a grip of gradually decreasing intensity is provided. A tight grip on the hose end is thus provided against both the outer and inner hose layers 8 and 9, or the outer and inner face portions of the hose end, and these grips are axially spaced one from the other so as not to localize the grip in a single position on the hose end. In some cases it may be found desirable to dip the nipple in oil or coat the same with a light grease in order to facilitate assembly of the coupling in the manner hereinbefore described.

While one form of the invention has been shown for purposes of illustration, it is to be clearly understood that various changes in the details of construction and arrangement of parts may be made without departing from the spirit and scope of the invention as defined in the appended claims.

We claim:

1. A coupling of the character described comprising a nipple member having an abutment shoulder and an externally threaded extension including a tapered end portion having a thin cylindrical end extremity insertible in the end of a hose, said nipple member having a bore therethrough of substantially the same diameter as the inside diameter of the hose, and a clamp sleeve threadably mountable on said externally threaded extension in opposition to said abutment shoulder and counterbored to provide an annular chamber surrounding said extension and in which the hose end is clamped, the threads on said extension extending into said chamber and being well rounded for engaging in the end of a clamped hose and said chamber being defined opposite said extension threads by a hose end abutment wall and an immediately adjacent smooth cylindrical wall having a diameter greater than the outside diameter of the hose but spaced outwardly from the outside diameter of the extension threads a distance less than the thickness of the hose and from the outside diameter of the cylindrical end extremity a distance greater than said hose thickness, and said chamber being defined at a point spaced axially from said extended threads by inwardly directed ribs adapted to embed in the exterior of the hose opposite the tapered nipple end portion as the nipple member and the clamp sleeve are threaded together, said ribs having an internal diameter approximately the same as the normal external diameter of the hose.

2. A coupling of the character described comprising a nipple member having an abutment shoulder and an externally threaded extension including an end portion having a thin cylindrical extremity of substantial length and a tapered portion of substantial length inward of the cylindrical extremity, said tapered portion and cylindrical extremity being insertable in the end of a hose, said nipple member having a bore therethrough of substantially the same diameter as the inside diameter of the hose, a clamp sleeve threadably mountable on said externally threaded extension and engageable with said abutment shoulder for limiting the threading movement, said sleeve being counterbored to provide an annular chamber surrounding said threaded extension, said chamber having an inwardly projecting rib means through which the cylindriform extremity passes during assembly of the coupling and against which the hose end is clamped by said tapered portion, said cylindrical extremity being inwardly spaced from said rib means a distance substantially equal to the wall thickness of a hose whereby said hose will be but slightly compressed therebetween when the cylindrical extremity passes through said rib means, the outer end of the cylindrical extremity being spaced sufficiently far from the tapered section whereby inward bulging of the hose immediately forward of the nipple and due to displacement of hose material from the clamped area will be prevented during the insertion of the nipple.

3. A coupling of the character described comprising a nipple member having an extension including a cylindrical extremity of substantial length and of uniform thin cross section throughout said substantial length, and a tapered portion also of substantial length extending inwardly of said cylindrical extremity, said extension also including an externally threaded cylindriform portion inward of said tapered portion, said thin cylindrical extremity, tapered portion, and threaded cylindriform portion being insertable into the end of a hose, said nipple member having a bore therethrough of substantially the same diameter as the inside diameter of the hose, a clamp sleeve threadably mountable on said extension, said sleeve being counterbored to provide an annular chamber surrounding the extension, said chamber having inwardly projecting rib means through which the cylindrical extremity passes during assembly of the coupling and adapted in the final assembly position to lie opposite substantially the entire tapered portion for clamping the portion of the hose end therebetween, said chamber having a cylindrical wall inward of the rib means and opposite the externally threaded cylindriform portion and having another cylindrical wall portion outwardly of said rib means and in position for lying opposite the thin cylindrical extremity, when the coupling is fully assembled, said cylindrical wall portion outwardly of the rib means being so spaced from the outer diameter of said thin cylindrical extremity that the hose portion opposite said outer cylindrical wall portion will be under substantially no clamping pressure, the thin cylindrical extremity being of such length that the leading edge thereof will pass substantially through said rib means before the tapered portion has moved opposite the said rib means for clamping the hose thereagainst during the assembly of the coupling.

EMMETT C. HARTLEY.
JOHN N. WOLFRAM.

REFERENCES CITED

The following references are of record in the file of this patent:

UNITED STATES PATENTS

| Number | Name | Date |
|---|---|---|
| 2,076,632 | Goodall | Apr. 13, 1937 |
| 2,171,945 | Norgren | Sept. 5, 1939 |
| 2,288,684 | Couty | July 7, 1942 |
| 2,333,349 | Weatherhead et al. | Nov. 2, 1943 |
| 2,358,019 | Melsom | Sept. 12, 1944 |
| 2,371,971 | Main et al. | Mar. 20, 1945 |